United States Patent Office

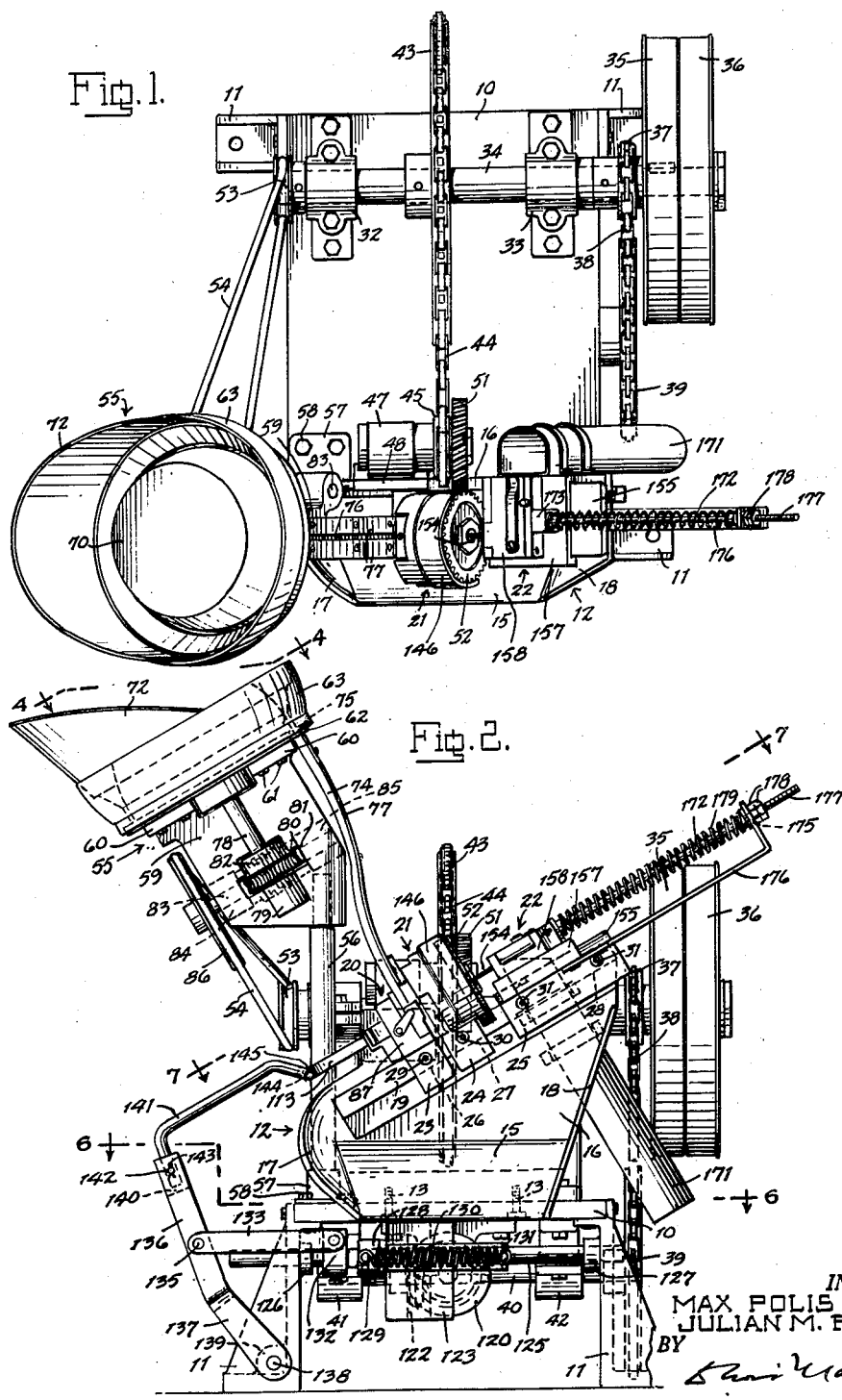

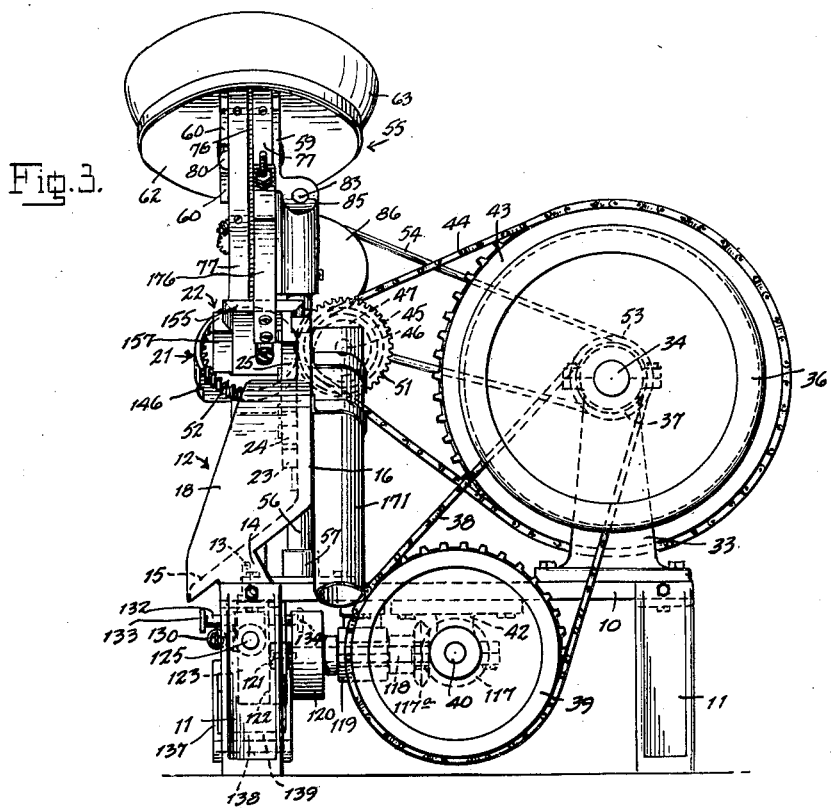

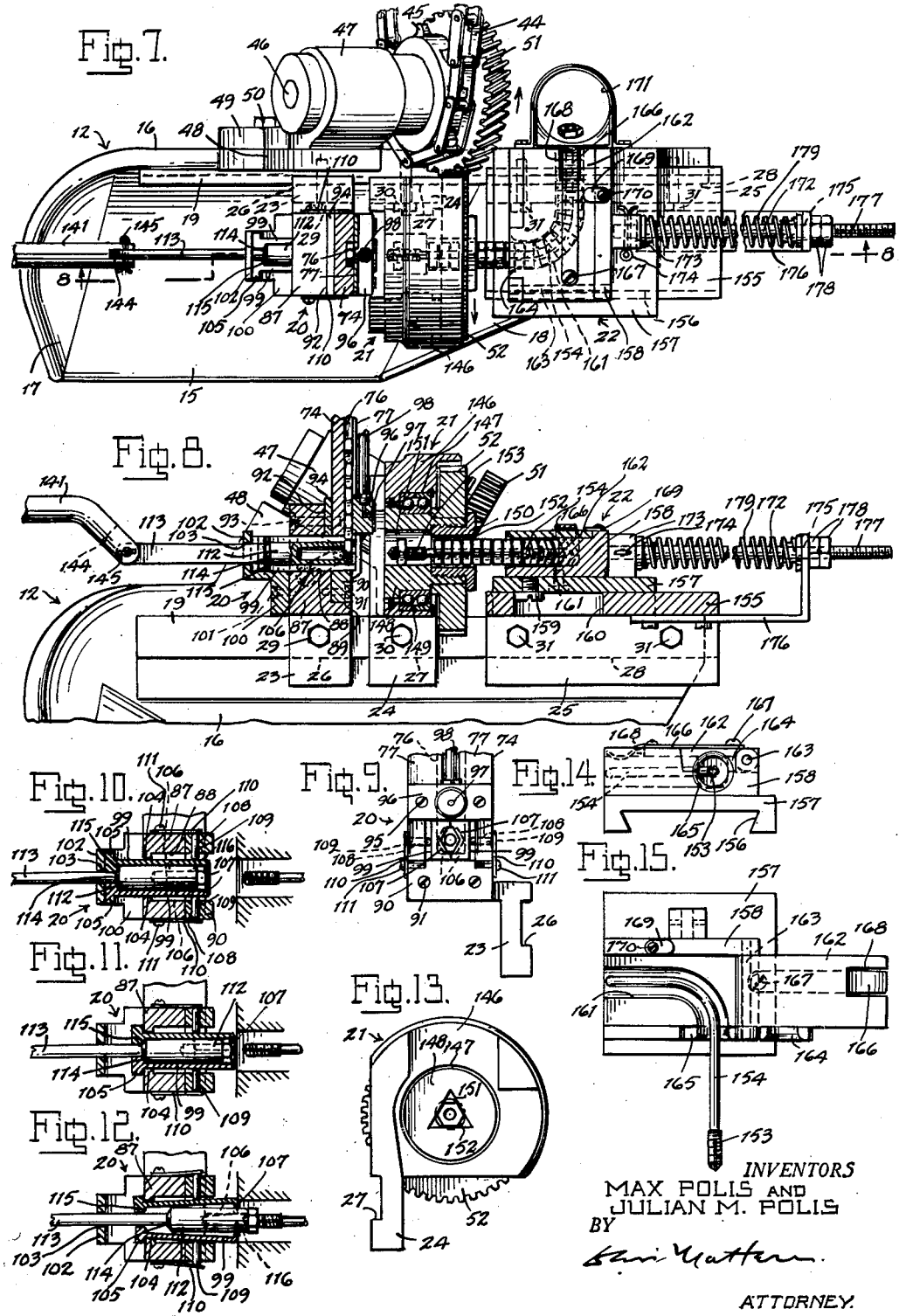

2,849,733
Patented Sept. 2, 1958

2,849,733
NUT TAPPING MACHINE HAVING A SPRING BIASED TAP HOLDER AND MEANS TO FEED NUT BLANKS THERETO

Max Polis, Winsted, and Julian M. Polis, Stamford, Conn.; said Julian M. Polis assignor to said Max Polis Application April 29, 1954, Serial No. 426,396

2 Claims. (Cl. 10—139)

This invention relates to a nut tapping machine and has for an object to provide a machine of this character of relatively inexpensive and simple construction, in which the nut tapping operation may be carried out at relatively high speed and with a high degree of accuracy.

It is particularly proposed to provide a nut tapping machine in which the nuts are individually fed from a hopper into relation with a spinning chuck in which the nuts are turned upon a tap disposed axially within the spinning chuck.

A further object is to provide feeding means whereby the nuts are pressed into engagement with the tap under a yielding pressure, to the end that the threads of the tap will be positively brought into cutting engagement with the hole in the nut to be tapped.

Another object is to provide a nut tapping machine in which oversized or irregularly shaped nut blanks will be automatically discarded.

Other objects and advantages of the invention will become apparent from a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and the scope of the appended claims.

In the drawings:

Fig. 1 is a plan view of a nut tapping machine according to the illustrated exemplary embodiment of the invention;

Fig. 2 is a front elevation;

Fig. 3 is a side elevation as seen from the right hand side of Figs. 1 and 2;

Fig. 4 is a top plan view of the hopper, into which a quantity of nuts to be tapped is placed, this view being taken in the direction indicated by the line 4—4 of Fig. 2;

Fig. 5 is a vertical sectional view of the hopper taken along the line 5—5 of Fig. 4;

Fig. 6 is a plan view of the base of the machine with parts broken away, the view being taken along the line 6—6 of Fig. 2, and showing the reciprocating feed mechanism;

Fig. 7 is a sectional plan view on an enlarged scale, taken in the direction indicated by the line 7—7 of Fig. 2;

Fig. 8 is a vertical sectional view taken along the line 8—8 of Fig. 7;

Fig. 9 is a side elevation showing the inner side of the nut feeding unit;

Fig. 10 is a horizontal sectional view of the nut feeding unit and a portion of the adjacent spinning chuck and tap, the parts being shown at the beginning of the feeding opeartion with the nut about to be fed into relation with the spinning chuck and tap;

Fig. 11 is a similar view showing the nut fed to a position contiguous to the spinning chuck and tap;

Fig. 12 is a similar view showing the nut fed into engagement with the tap;

Fig. 13 is a side elevation showing the nut receiving side of the spinning chuck;

Fig. 14 is a side elevation of the tap holding unit; and

Fig. 15 is a top plan view of the tap holding unit with the cover part in open position.

Referring to the drawings, the nut tapping machine, according to the illustrated exemplary embodiment of the invention, comprises a platform base consisting of a rectangular bed plate 10 and supporting legs 11 at its four corners, an upright fixture, generally indicated as 12, being secured upon the forward end of the bed plate by means of bolts 13 engaged upwardly through the bed into the mounting base 14 of the fixture. This fixture includes a downwardly and forwardly inclined base wall 15, a vertical rear wall 16 and downwardly and forwardly inclined end walls 17 and 18, the latter forming with the inclined base and the rear wall a forwardly facing trough-like structure into which cutting oil, chips, etc., produced by the tapping operation drop and flow into a suitable receptacle, as will hereinafter more fully appear.

The upper edge of the vertical wall 16 is inclined in an upward direction from the left hand side of the fixture to the right hand side, and is provided upon the forward face of the wall 16 with an inclined rib 19 upon which are mounted for longitudinal adjustment a nut feeding unit 20, a spinning chuck unit 21, and a tap holding unit 22, these units being respectively provided with mounting flanges 23, 24 and 25, respectively provided with slots 26, 27 and 28 in their rearward side engaged by the rib 19 and respectively secured to the rib by bolts 29, 30 and 31.

Adjacent the rearward edge of the bed plate 10 there are mounted pedestal bearings 32 and 33 in which is journalled a drive shaft 34 provided upon one end with a fixed pulley 35 and a loose pulley 36 adapted to be driven by a suitable belt drive, the belt being shiftable from the loose pulley to the fixed pulley to drive the shaft 34. A sprocket gear 37 is secured upon the shaft 34 between the pulley 35 and the bearing 33 and drives through a sprocket chain 38 a sprocket gear 39 mounted upon the end of a shaft 40 journalled in pedestal bearings 41 and 42 at the under side of the bed plate 10, this shaft adapted, as will hereinafter more fully appear, to drive reciprocating feed mechanism for the intermittent feed of the nuts to be tapped.

Intermediate the bearings 32 and 33 there is mounted on the shaft 34 a large sprocket gear 43 which drives, through a sprocket chain 44, a small sprocket gear 45 mounted upon a shaft 46 journalled in a bearing 47 mounted upon the rearward side of the vertical wall 16 of the fixture 12, the latter being provided at its upper edge with an upwardly projecting mounting portion 48 to which the mounting base 49 of the bearing 47 is secured by screws 50, as shown clearly in Fig. 7. The shaft 46 also has mounted thereon a spiral gear 51 which meshes with and drives the spur gear 52 of the spinning chuck unit 21 in which the nuts to be tapped are turned in relation to the tap, as will hereinafter more fully appear.

Upon the left hand end of the shaft 34, as seen in Fig. 1, there is secured a grooved pulley 53 which drives through a belt 54 the nut feeding hopper, indicated generally as 55, and which is adapted to feed by gravity a succession of nuts to the intermittent nut feeding unit 20, as will hereinafter more fully appear. The hopper is mounted in elevated relation upon a vertical post 56 having a flanged mounting base 57 secured by bolts 58 to the bed plate 10, the hopper comprising a cast metal frame 59 mounted upon the upper end of the post 56 and having secured upon mounting flanges 60 as its upper end, by bolts 61, a circular bowl-like hopper consisting of a circular base plate 62 and an upwardly and outwardly extending peripheral wall 63 secured to the base plate by bolt 64. The inner side of the peripheral wall 63 is provided adjacent the base plate 62 with a cylindrical wall surface 65 from which a flared surface 66 extends upwardly and outwardly. The base wall 62 is provided with a central bearing opening 67 in which is engaged the hub 68 of a rotating plate 69 having its cylindrical periphery concentric to and inwardly spaced from the cylindrical inner surface 65 of the wall 63 to thus provide an annular recess or channel of a width slightly greater than the thickness of the nuts to be tapped, so that a series of the nuts in the hopper will move into this space in single file relation.

A block member 70 is secured upon the plate 69 by means of bolts 71 and has an upwardly and inwardly tapered peripheral wall which, with the upwardly and outwardly flared surface 66 of the wall 63, provides an annular space into which a quantity of nuts may be placed. The hopper is disposed at an angle corresponding to the incline of the upper edge of the fixture 12, and at the lower side of the wall 62 there is provided a scoop-like retaining wall member 72 which enables a relatively large quantity of nuts to be placed in the hopper in the lower side.

Upon the cylindrical periphery of the rotating plate 69 are provided a series of lugs 73 which serve to propel the nuts arranged in single file in the annular channel of the hopper from the lower side to the upper side where they drop singly into an open ended guide chute 74 which has its upper end secured in an opening in the base plate 62 of the hopper by means of set screws 75. The chute is provided along its length with a channel 76 in which the nuts are guided in single file stacked relation, being retained in the channel by retaining strips 77—77 secured upon the chute at each side of the channel, and which have their inner edges spaced apart, as seen clearly in Fig. 3, so that the nuts moving in the channel may be observed. The lower end of the chute is connected to the nut feeding unit 20, as will hereinafter more fully appear.

The hopper is driven by means of a shaft 78 secured in the hub 68 of the rotating plate 69 and journalled at its lower end in a thrust bearing portion 79 formed upon the cast metal frame 59, a worm gear 80 being secured upon the shaft 68 and extending through an opening 81 in the frame 59 where it meshes with a worm 82 secured upon a shaft 83 journalled in bearing portions 84 and 85 formed upon the cast metal frame 59. A grooved pulley 86 is secured upon the end of the shaft 83 over which the driving belt 54 from the driving pulley 53 is engaged.

The nut feeding unit 20 has integrally formed with its mounting flange 23 a body portion 87 in the form of a generally rectangular shaped block which is provided with a rectangular passage 88 extending horizontally therethrough from its outer to its inner side. Upon the inner side, below the passage 88, there is provided a recess 89 in which the lower transverse portion of a U-shaped member 90 is secured by screws 91, the upper side of the transverse portion being flush with the lower side of the passage 88, the inner sides of the upright portions being flush with the inner sides of the passage 88, and the upper ends of the upright portions being flush with the upper side of the passage 88.

At the inner side of the block portion 87, above the passage 88, there is provided a recess 92 in which the lower end of the nut feeding guide chute 74 is secured by screws 93, a spacer piece 94 being interposed between the end of the chute and the wall of the recess 92 for the purpose of permitting chutes of different dimensions to be secured to the nut feeding unit. The lower end of the chute is flush with the upper side of the passage 88 and forms the top of a rectangular space into which the nuts within the chute drop by gravity, the bottom and sides of the space being formed by the U-shaped member 90. The retaining strips 77—77 terminate in upwardly spaced relation to the lower end of the chute, and within the space thus provided there is secured by screws 95 a block member 96 having a lubricant or cutting fluid duct 97 extending downwardly from its upper face and outwardly through its front face, a pipe-line 98 being connected to the duct and adapted to supply fluid thereto which is dispersed over the nuts at the point at which they are being cut by the tap, as will presently more fully appear.

Within the passage 88 there is provided a pair of finger members 99—99 adapted to have lateral outward and inward swinging movement, these members being slidably engageable at their upper and lower sides with the upper and lower sides of the passage 88, and extending outwardly from the passage upon a bracket member 100 secured to the block member 87 by screws 101, and which has its upper surface flush with the lower surface of the passage 88. A vertical wall 102 is provided at the outer end of the bracket in outwardly spaced relation to the block member 87, and is provided with a guide passage 103 for engagement by a reciprocating feed member, presently to be more fully referred to.

As seen in Fig. 10, the finger members 99—99 are engaged intermediate their ends by fulcrum projections 104—104 provided upon the upright sides of the passage 88 at its outer end, the finger members being substantially parallel to the side walls of the passage. At the rearward end of the finger members there are provided outwardly projecting lug portions 105 which, in the retracted position as shown in Fig. 10, abut the wall 102, and which, in the projected position as shown in Fig. 11, abut the fulcrum portions 104 at the outer end of the passage 88 to limit the projecting movement.

At the forward ends of the finger members 99 there are provided at their lower sides base flanges 106 which in the closed position of the finger members, as seen in Figs. 9 and 10, abut each other and form with the sides of the finger members a U-shaped pocket, which in the retracted position is in vertical line with the lower end of the feed channel 76 of the chute 74, so that a nut to be tapped may drop into this pocket where it is retained against outward displacement by retaining flanges 107—107 provided upon the forward ends of the fingers 99. These retaining flanges have an angular shape at their inner edges substantially corresponding to the angular shape of the sides of a hexagonal nut, the closed position of the fingers, however, bringing these inner edges inwardly of the side edges of the nut, as clearly shown in Fig. 9. Upon opening of the fingers it will be seen that the flanges 107 will spread apart to provide an opening substantially corresponding to the shape of the hexagonal nut and through which it may be propelled forwardly.

The upright portions of the U-shaped member 90 are provided with opposed passages 108—108 in which there are slidably engaged plungers 109—109, engaged at their outer ends by leaf springs 110—110 secured upon the sides of the block member 87 by screws 111—111, these springs normally pressing the plungers inwardly against the side faces of the finger members 99 and adapted to yield outwardly upon lateral outward swinging movement of the finger members to release the nut, as shown in Fig. 12, and as will presently be more fully pointed out.

Disposed between the finger members 99 is a feeding plunger 112 of cylindrical form having a stem 113 extending outwardly between inwardly extending shoulder portions 114—114 at the outer ends of the finger members 99, and through the guide passage 103 of the wall 102, reciprocatory movement adapted to be imparted to this plunger by mechanism presently to be described. The plunger has a shoulder 115 at its outer end which in its retracted position, as seen in Fig. 10, abuts the shoulders 114 of the finger members 99, the forward end of the plunger being spaced inwardly from the retaining flanges 107 at the forward ends of the finger members a distance substantially corresponding to the thickness of a nut, so that a nut to be fed drops by gravity into the pocket at the forward end of the finger members in front of the plunger member. A bore 116 is provided in the inner end of the plunger coaxial with the hole in the nut to be tapped, and which provides clearance for the engagement of the tap, as will presently more fully appear.

In feeding a nut to be tapped from the position as shown in Fig. 10 where the nut has dropped into the pocket in front of the plunger 112, the forward movement of the plunger carries with it the two finger members 99 and thus moves the nut to be tapped forwardly from beneath the chute, the next nut to be tapped at this point resting upon the upper side of the plunger. The forward movement of the finger members is arrested by the engagement of the lugs 105 with the fulcrum portions 104, but the plunger has a continued forward movement which forces the nut forwardly against the retaining flanges 107 which, being slightly bevelled at their inner surfaces, causes the finger members to spread or swing outwardly about the fulcrum portions 104 against the pressure of the spring pressed plungers 109, thus allowing the nut to be fed forwardly to the tap within the spinning chuck, presently to be more fully described. Upon retracting movement of the plunger, it first moves back to the position shown in Fig. 11, whereupon the shoulder 114 of the plunger engages the shoulders 115 of the fingers, so that continued movement of the plunger moves the finger members to the retracted position, as seen in Fig. 10. At this point the next nut to be tapped drops into the pocket at the forward end of the finger members.

The mechanism for reciprocating the plunger 112 of the nut feeding unit 20 is driven by the shaft 40 mounted at the under side of the bed plate 10, and comprises a miter gear 117 secured upon the shaft 40, which meshes with a miter gear 117a mounted upon the inner end of a shaft 118, journalled in a bearing 119 secured to the under side of the bed plate 10, and having secured upon its forward end a crank drum 120 having rotatably mounted upon its forward face a crank member 121 in the form of a rectangular block. The crank member 121 is slidably engaged in a vertical slot 122 provided in the rearward side of a slide block 123 having a horizontal passage 124 in which is slidably engaged a reciprocating slide rod 125 slidably mounted in bearings 126 and 127 respectively provided upon the forward legs 11 of the platform base, these bearings being preferably cast integrally with the legs.

The slide block 123 is of rectangular shape and its flat upper side slidably engages the under side of the bed plate 10 to thus maintain its vertical position upon the rod 125. A collar 128 is secured upon the rod 125 at the left hand side of the slide block 123 and is provided with a forwardly projecting finger 129, to which one end of a helical spring 130 is connected, its other end being connected to an angle bracket 131 secured upon the forward side of the slide block 123. This spring normally draws the collar 128 against the left hand side of the slide block 123, and as the crank drum 120 is rotated the crank member 121 reciprocates the slide block 123 in the longitudinal direction of the rod 125, movement to the left causing the rod 125 to be moved to the left through the positive engagement with the collar 128, but movement to the right being imparted to the rod 125 through the spring connection 124 so that in the event there is any interference with the movement of the rod 125 to the right, the slide block 123 may continue its movement to the right, in which case the expanded spring applies spring pressure to the rod 125. This action is for the purpose of applying a yielding pressure to the nut as it is being tapped, as will presently more fully appear.

Between the collar 128 and the bearing 126 there is secured upon the slide rod 125 a cross bar 132, connected at its ends by links 133 and 134 to a cross bar 135 secured to and projecting at each side of a lever 136, provided at its lower forked end 137 with a transverse shaft 138 pivotally mounted in a bearing portion 139 formed upon the base portion of the forward leg 11 at the left hand side of the machine. The upper end of the lever 136 is provided with a slot 140 in which one angularly bent end of a connecting rod 141 is pivotally connected by a pivot pin 142 secured by a cotter pin 143, the other angularly bent end of the connecting rod 141 being provided with a slot 144 in which the outer end of the stem 113 of the plunger 112 is engaged and pivotally connected by a cotter pin 145. As the slide rod 125 is reciprocated back and forth the lever 136 is oscillated to impart to and fro reciprocatory movement to the plunger 112 to thus successively feed the nuts to the spinning chuck.

The spinning chuck 21 comprises a substantially circular body 146 integrally formed upon the mounting flange 24, and provided with an opening 147 in which a chuck member 148 is rotatably mounted upon ball bearings 149, the chuck having secured upon its inner shouldered end the spur gear 52 which is in mesh with the driving spiral gear 51, the spur gear being secured in place by a threaded flanged thimble 150 screwed into the inner end of the chuck member. The chuck member is provided with a nut-receiving triangular cross-section passage 151 in axial line with the feeding plunger 112, adapted to receive the hexagonal nut to be tapped in non-rotatable relation to the chuck member. The nut to be tapped is thus adapted to turn with the chuck member and is also adapted to move axially through the passage 151 into a cylindrical passage 152 in the thimble 150.

The tap comprises a thread tap end 153 and an elongated stem 154 having a wide radius right angular bend intermediate its ends, the thread tap end being disposed within the chuck passage 151, and the stem extending axially through the cylindrical passage 152 of the thimble and thence to the tap holding unit 22 which supports it in substantially floating relation, the nuts as they are tapped moving off of the thread tap end 153 onto the stem 154, and thereupon being pushed through the tap holding unit from which they are successively ejected as the newly tapped nuts successively move off the thread tap end 153.

The tap holding unit comprises a flat support 155 integrally formed with and extending outwardly at a right angle to the mounting flange 25, the side walls of the support being dove-tailed and slidably engaged by the dove-tail slot 156 in the under side of the slide base 157 of the tap holder member 158, the movement of the slide base being limited by a set screw 159 engaged in a slot 160 in the support 155. The tap holder member 158 is provided with an angular channel 161 in which the angular stem 154 is adapted to be arranged in centralized position, as shown in Fig. 15, the stem being supported in such centralized position by a series of nuts engaged upon the stem and disposed in the channel, as shown clearly in Figs. 7 and 8.

The channel is normally closed at its upper side by a cover 162 hingedly mounted upon a pin 163 and provided with a substantially semi-circular ferrule portion 164 which, in the closed position as seen in Fig. 14, is complementary to a semi-circular ferrule portion 165 at the entrance end of the channel 161, the portions 164 and 165 when brought together forming a circular ferrule entrance to the channel for the nuts moving upon the stem 154. A leaf spring 166 is secured upon the upper side of the cover 162 by a screw 167 and its forward downwardly curved end is engaged in a cutout 168 in the cover, where it yieldably presses upon the nuts adjacent the outer end of the channel 161, so as to retard their movement upon the stem 154. The cover is normally held in closed position by a pivoted latch piece 169 secured by a set screw 170, the movement of the latch piece over the cover, as seen in Fig. 7, retaining it closed. Upon release the cover may be opened, as seen in Fig. 15. Adjacent the outward end of the channel 161 there is mounted, upon the rearward side of the fixture 16, a tube 171 through which the tapped nuts ejected from the channel 161 drop into a suitable receptacle.

A rod 172 is removably secured to an extension part 173 of the tap holder member 158 by means of a cotter pin 174, and extends through a guide passage 175 in the end of an angle bracket 176 secured to the under side of the base member 155 and extending rearwardly therefrom. The end of the rod is screw threaded as at 177 and has engaged thereon a pair of stop nuts 178 which limit the forward movement of the tap support member, a helical spring 179 being engaged upon the rod between the extension part 173 and the bracket 176 and normally pressing the tap holder member forwardly. With this arrangement, any excessive pressure upon the tap produced during the tapping operation causes the tap supporting member to yield rearwardly against the pressure of the spring 179. This action, in cooperation with the yieldable pressure applied to the plunger 112 when the forward movement of the latter is arrested, results in an engagement of the nut with the tap under yielding pressure in both directions thus insuring a positive engagement of the tap in the hole of a nut, so that the threads effectually take hold and produce a true thread cut in the hole of the nut.

In operation, the main drive shaft 34 synchronously drives the spinning chuck 148 through the sprocket chain 44, the reciprocating plunger 112 through the sprocket chain 39, and the rotatable block member 70 of the hopper 63 through the belt 54, so that the timing of the feeding and tapping of the nut blanks is co-related. A quantity of nut blanks is placed in the hopper and these are agitated by the rotating block member so that they drop into the annular channel surrounding the block member in single file edge-to-edge relation, where they are propelled by the lugs 73 to the chute 74 where they are guided in superimposed edge-to-edge relation to the nut feeding unit 20. As seen in Fig. 10 the nut blank is disposed in the pocket between the fingers 99 forwardly of the plunger 112, and as the latter is reciprocated forwardly, as seen in Fig. 11, it carries with it the fingers and the nut to a point where the retaining fingers 107 of the flanges are adjacent the face of the spinning chuck 148 and the nut is axially aligned with the tap disposed in the passage 151 of the chuck, the forward movement of the fingers being stopped by engagement of the lug portions 105 with the fulcrum portions 104.

Continued forward movement of the plunger forces the nut blank from between the fingers, as seen in Fig. 12, and engages it in the passage 151 and upon the end of the tap. At this point yielding pressure is exerted between the nut blank and the tap through the action of the spring 130 which is placed under tension when the forward movement of the plunger is arrested, and also through the action of the spring 179 of the tap holder unit 22 which allows the tap holder unit to yield under pressure of the engagement of the nut blank with the tap. This results in a positive starting engagement of the nut blank with the tap, the yielding pressure being maintained sufficiently long to permit the tap threads to take hold in the aperture of the nut blank. As soon as this occurs the spinning chuck will turn the nut blank upon the tap to thread it, the blank being at the same time fed through the triangular opening 151 along the length of the thread tap end 153, thereupon moving off therefrom onto the tap stem 154. The previously tapped nuts are engaged along the length of the stem and are guided through the channel 161 of the tap holder unit 22, a nut at the outer end of the channel being ejected into the tube 171 as a newly threaded nut moves off the thread tap end 153 and thus propels the succession of nuts upon the stem.

The triangular opening 151 is such that it will only receive nut blanks of proper size and shape, so that misshaped or oversized nut blanks will not enter the passage. Such nut blanks which fail to enter the passage 151 will simply drop onto the base 15 of the fixture 12, where they will be carried with the flow of the cutting fluid to a suitable receptacle.

The machine is readily adaptable to the tapping of nuts of various sizes and thread gauges, simply by replacing the units 20, 21 and 22 upon the rib 19 with similar units of the proper size for the nuts to be tapped.

What is claimed is:

1. In a nut tapping machine, a spinning chuck comprising a rotatable member having an axial passage therethrough to receive a nut blank in non-rotatable relation for axial movement therethrough, a tap member having a thread tap end disposed axially in said passage and a stem extending outwardly therefrom, and means for successively feeding apertured nut blanks to be tapped to said spinning chuck, comprising a pair of fingers defining the sides of a nut blank receiving pocket portion in axial line with said chuck, a guide support having a passage in which said fingers are guided for projecting and retracting reciprocatory movement and for opening and closing swinging movement, stop means for limiting the projecting movement of said fingers, stop means for limiting the retracting movement of said fingers, nut retaining flanges at the ends of said fingers toward said chuck adapted to engage one side of a nut blank to retain it, a reciprocating feed member having a plunger disposed between said fingers adapted through projecting movement to engage the other side of said nut blank to project said fingers to the limit of their projecting movement, continued projecting movement of said plunger adapted to swing said fingers to open position through the forcing of said nut blank from its retained position in engagement with said flanges into engagement with said tap member, and shoulder means carried by said fingers engageable by said plunger during its retracting movement to retract said fingers to the limit of their retracting movement.

2. In a nut tapping machine, a spinning chuck comprising a rotatable member having an axial passage therethrough to receive a nut blank in non-rotatable relation for axial movement therethrough, a tap member having a thread tap end disposed axially in said passage and a stem extending outwardly therefrom having a right angle bend intermediate said thread tap end and its terminal end and upon which the threaded nuts move away from said thread tap end and discharge from said terminal end, a tap holder member for said tap member, having an open-ended continuous right angular passage in which said stem is disposed in substantially parallel spaced relation to the wall of said passage and through which said nuts are guided in contact with said wall as they move upon said stem, a support for said holder member permitting reciprocatory movement thereof parallel to the axis of said chuck passage, adjustable stop means limiting the movement of said holder member toward said chuck, spring means exerting pressure on said holder member toward said chuck in a direction parallel to the axis of said chuck passage and permitting yielding movement of said holder member away from said chuck, and feeding means for successively feeding apertured nut blanks to be tapped into engagement with the thread tap end of said tap member within said spinning chuck comprising a nut blank receiving pocket portion axially aligned with said chuck, a reciprocating feed member engageable with a nut blank in said pocket to feed it into said chuck passage for engagement of said thread tap end in its aperture, and means for applying yielding pressure to said feed member toward said thread tap end at the time the nut blank is put into engagement with said thread tap end.

References Cited in the file of this patent
UNITED STATES PATENTS

| | | |
|---|---|---|
| 1,678,463 | Davis | July 24, 1928 |
| 1,833,182 | Safford | Nov. 24, 1931 |
| 1,882,910 | Rich | Oct. 18, 1932 |
| 1,905,715 | Ingram et al. | Apr. 25, 1933 |
| 2,046,520 | Lundell | July 7, 1936 |
| 2,089,930 | Carlson | Aug. 10, 1937 |
| 2,141,280 | Selman | Dec. 27, 1938 |
| 2,201,051 | Ogilvie | May 14, 1940 |
| 2,249,196 | Baxendale | July 15, 1941 |
| 2,521,209 | Fether | Sept. 5, 1950 |